United States Patent [19]

Edwards et al.

[11] Patent Number: 4,614,772

[45] Date of Patent: Sep. 30, 1986

[54] LOW MOLECULAR WEIGHT POLYMER PROCESS

[75] Inventors: Douglas C. Edwards; Dilipkumar Padliya, both of Sarnia, Canada

[73] Assignee: Polysar Limited, Sarnia, Canada

[21] Appl. No.: 780,334

[22] Filed: Sep. 26, 1985

Related U.S. Application Data

[63] Continuation-in-part of Ser. No. 665,946, Oct. 29, 1984, abandoned.

[51] Int. Cl.[4] ............................................. C08F 8/50
[52] U.S. Cl. ................................. 525/388; 525/332.8
[58] Field of Search ......................................... 525/388

[56] References Cited

U.S. PATENT DOCUMENTS

| | | | |
|---|---|---|---|
| 3,144,436 | 8/1964 | Greene et al. | 525/388 |
| 3,232,918 | 2/1966 | Rayner | 525/388 |
| 3,634,381 | 1/1972 | Lehnerer et al. | 528/481 |

FOREIGN PATENT DOCUMENTS

| | | |
|---|---|---|
| 53-146732 | 12/1978 | Japan . |
| 959362 | 6/1964 | United Kingdom . |

OTHER PUBLICATIONS

Chemical Abstracts, 1982, vol. 96, 86524r.
Plastics Design and Processing, vol. 12, 1972, Aug., pp. 24–29, Gras, "New Applications for Twin-Screw Extruders".
Modern Plastics Technology, Seymour, 1975, pp. 49–53.
Chemical Abstracts–1970, vol. 73, 131693h.

*Primary Examiner*—Paul R. Michl
*Attorney, Agent, or Firm*—Stevens, Davis, Miller & Mosher

[57] ABSTRACT

A process is provided for the production of low molecular weight isobutylene polymer by reacting at a temperature of from about 150° to about 250° C. an isobutylene-conjugated diolefin polymer with an oxygen-containing gas in an extruder.

10 Claims, No Drawings

LOW MOLECULAR WEIGHT POLYMER PROCESS

BACKGROUND OF THE INVENTION

This application is a continuation-in-part of Ser. No. 665,946, filed Oct. 29, 1984, and now abandoned.

This invention is directed to a process for the production of low molecular weight polymer by reaction in an extruder of a high molecular weight polymer with an oxygen-containing gas.

DESCRIPTION OF THE PRIOR ART

Much work has been published in the academic literature on the degradation of polyisobutylene in solution because the polyisobutylene molecule is very convenient to work with. The purpose of such work has generally been to attempt to identify what actually happens during degradation and the kinetics associated with the so-identified mechanism.

French Demande No. 2,007,125, according to Chemical Abstracts 1970, Volume 73, 131693h, describes the thermal degradation of high molecular weight polyisobutylene to a reduced molecular weight polymer in an extruder whereby shear forces are applied in three degradation zones connected by transfer zones, the first degradation zone being at 280° C., the second degradation zone being at 313° C. and the third zone being at 310° C.

German published application No. 3,008,389, according to Chemical Abstracts 1982, Volume 96, 86524r, describes the prevention of carbon formation during the thermal degradation of polyisobutylene at temperatures up to about 350° C. by a process as described in French Demande No. 2,007,125, by the addition of 100 ppm of tocopherol.

SUMMARY OF THE INVENTION

We have now found that the degradation of isobutylene-conjugated diolefin polymers (as opposed to the degradation of polyisobutylene) may advantageously be conducted at significantly lower temperatures by means of an oxidative rather than thermal process in the absence of added free radical sources such as organic peroxides, thereby eliminating problems of carbon formation and providing improved process control and control of the molecular weight of the product of the process and providing a product having essentially no oxygen containing (such as carbonyl) groups.

Accordingly, the present invention is directed to a process for the production of a low molecular weight isobutylene polymer which comprises feeding to an extruder an isobutylene-conjugated diolefin copolymer containing essentially no antioxidant-type component having a molecular weight $M_w$ of from about $350 \times 10^3$ to about $700 \times 10^3$ and having no added free radical sources and reacting said polymer with gas within said extruder to produce said low molecular weight polymer having a molecular weight $M_w$ of from about $25 \times 10^3$ to about $150 \times 10^3$, characterized in that:

(a) said extruder consists essentially of a twin screw extruder mixer device capable of providing a high degree of interfacial contact between the viscous polymeric material and a gaseous phase and having a feed section, a reaction section and a volatiles removal section, and being equipped with a gas feed port attached to and communicating with the interior of the extruder barrel at a point closely adjacent to the junction of the feed section and the reaction section, and being equipped with a gas vent port attached to and communicating with the interior of the extruder barrel at a point closely adjacent to the junction of the reaction section and the volatiles removal section and a second vent port also connected to a vacuum means attached to and communicating with the interior of said extruder barrel at a point within the volatiles removal section, the screws within the reaction section being equipped with shearing flights and within the feed section and volatiles removal section being equipped with mixing and conveying flights, (b) said polymer is conveyed through said extruder by said screws and is reacted in at least said reaction section with gas supplied from said gas feed port, gas is removed through said gas vent port and any volatile materials are removed through said second vent port, (c) said extruder is maintained at a temperature of from about 150° to about 250° C., (d) the residence time for said polymer in said extruder from said gas feed port to said gas vent port is from about 0.5 to about 3 minutes, and (e) the gas supplied to said gas feed port is an oxygen-containing gas selected from air or a mixture of gases containing not less than about 5 and not more than about 30 per cent by volume of oxygen and one or more chemically inert gases at a pressure of from about 1.1 to about 3.5 kg/cm² at a rate in liters/hour of from about 10 to about 500 times the polymer throughput rate in kg/hour.

DETAILED DESCRIPTION OF THE INVENTION

Suitable isobutylene-conjugated diolefin copolymers for use in the present invention are the copolymers of isobutylene and $C_4$–$C_6$ conjugated diolefins. Such copolymers contain from about 95 to about 99.5 mole per cent of isobutylene and from about 0.5 to about 5 mole per cent of $C_4$–$C_6$ conjugated diolefin. Suitable such conjugated diolefins are isoprene, 2,3-dimethyl butadiene and piperylene. The preferred such conjugated diolefin is isoprene and the preferred copolymer contains from about 98 to about 99 mole per cent of isobutylene and from about 1 to about 2 mole per cent of isoprene. Such copolymers should contain essentially no antioxidant-type component: antioxidants such as amine, phenol, phosphite and other types are well known in the industry and the presence of more than about 50 to 100 parts per million of such antioxidant-type components significantly interfere with the process of the present invention.

The isobutylene-conjugated diolefin copolymers supplied to the process of the present invention will have a molecular weight $M_w$ of from about $350 \times 10^3$ to about $700 \times 10^3$. Such molecular weight can readily be determined by methods well known in the art such as by calculation from the intrinsic viscosity or from a gel permeation chromatography analysis. Another means of expressing the molecular weight is the Mooney viscosity and Mooney viscosities (ML-1+12 at 125° C.) corresponding approximately to the above molecular ranges are from about 20 to about 70.

The isobutylene-conjugated diolefin copolymer supplied to the process contains no source of added free radicals and free radical sources are not added to the process at any other point. By free radical sources is meant those chemicals known in the art as forming free radicals on heating, such as organic and inorganic peroxides, organic hydroperoxides, peresters, bis-azo compounds, etc. Such free radical sources are not required in the present process and the reaction of the gas with fresh polymer surfaces is believed to be the mechanism whereby the molecular weight reduction is achieved.

The low molecular weight isobutylene-containing polymers produced by the process of the present invention will have a molecular weight $M_w$ of from about $25 \times 10^3$ to about $150 \times 10^3$: a corresponding Mooney viscosity cannot be determined accurately on such low molecular weight polymers.

The low molecular weight isobutylene-containing polymers contain essentially no oxygen containing groups, such as carbonyl groups. Infra red analysis of the polymer shows very minor peaks in the region of $1750$ cm$^{-1}$ which are essentially identical in location and peak height to those found in the original isobutylene-conjugated diolefin copolymer.

The polymer fed to the extruder may be supplied in any suitable form, such as strips or ribbons or as particles. The form of such polymer is not of significance to the present process. It is preferred to feed the polymer to the extruder as particles, in which case the polymer particles may be coated with a partitioning agent, such as talc, calcium carbonate or clay powder, to sustain the integrity of such particles and prevent them from re-agglomerating. The presence or absence of a partitioning agent on the polymer particles has no known influence on the present process.

A preferred extruder for use in the present process consists essentially of two screws rotatably mounted within the extruder barrel, a feed section, a reaction section, a volatiles removal section and an exit die. The two screws are co-rotating intermeshing screws, each screw being equipped with identical flights and extending throughout the extruder barrel from the feed section and terminating at the exit die. The screws are rotated by an external means such as an electric or a hydraulic drive having the capability of rotating the screws at pre-selected rates of rotation. The feed section of the extruder is a conventional hopper, whereby polymer can be fed into the extruder barrel and picked up by the screws, and a relatively short length of the extruder for the purpose of mixing the polymer supplied to the extruder and conveying it along the extruder. At a point downstream of the extruder and at a point closely adjacent to the junction of the feed section and the reaction section a gas feed port is attached to the extruder barrel such that it is in communication with the interior of the extruder barrel—thereby gas supplied from the gas feed port can be supplied to and mixed in with the polymer within the extruder barrel. In a most preferred configuration, the screws will have a short section of flights designed to prevent the back flow of polymer and gas, such flights being located at the downstream end of the feed section and upstream of the gas inlet port. The configuration of the flights within the feed section is such as to cause mixing and conveying. Immediately downstream of the feed section is the reaction section. Within the reaction section the flights on the screws are such as to cause shearing of the polymer—the design of such flights is well known in the art. While not fully understanding the mechanism involved, it is believed essential to create fresh polymer surface to react with the gas mixed with the polymer in the reaction section. Downstream of the reaction section is the volatiles removal section which extends downstream to the exit die. In a most preferred configuration, shortly downstream of the start of the volatiles removal section the screws will have a short section of flight configuration to create back pressure and prevent the unrestricted downstream flow of the gas mixed with the polymer. The volatiles removal section is equipped with a gas vent port attached to the extruder barrel located at a point closely adjacent to the junction of the reaction section and the volatiles removal section. The gas vent port is to allow a major proportion of the gas mixed with the polymer to be vented from the mixture and removed from the extruder and accordingly the gas vent port is in communication with the interior of the extruder barrel. In a most preferred configuration, downstream of the gas vent port the screws will have a short section of flight configuration designed to provide a seal to prevent back flow and to control the downstream flow of the polymer. Downstream of the gas vent port is a second vent port attached to the extruder barrel and communicating with the interior of the extruder barrel. This second vent port is also connected to a vacuum means so that any volatile materials present in the polymer may be removed through the vent port. Suitably, such a vacuum means may be capable of creating a vacuum of from about 25 to about 70 cms of mercury. In a most preferred configuration, downstream of the second vent port the screws will have a short section of flight configuration designed to provide a seal to prevent back flow and to prevent air or other gas entering the extruder and to control the downstream flow of the polymer. The screws within the volatiles removal section convey the polymer to and force it through the exit die and accordingly are equipped with mixing and conveying flights. The polymer from the die may be collected in any suitable means for use and/or packaging.

The extruder is maintained at a temperature of from about 150° to about 250° C., preferably from about 180° to about 230° C. It is preferred that the temperature be fairly uniform over the length of the extruder, and accordingly the extruder is preferably equipped with heating and cooling means for control of the temperature. Temperatures in excess of about 250° C. are not desirable for the process of this invention in order to minimize thermal degradation and the concurrent formation of carbon, very low molecular weight materials and other volatile components. In contrast to the prior art processes, the present process is an oxidative degradation process operating at a relatively low temperature. At temperatures below about 150° to about 160° C. the desired reduction in molecular weight in the present process is not achieved whereas at temperatures above about 240° to about 250° C. control of the reduction in molecular weight is increasingly difficult. Thus it is critical for the oxidative degradation process of the present invention to maintain the temperature of the extruder from about 150° to about 250° C., preferably from about 180° to about 230° C.

Within the extruder, the residence time for the polymer from the gas feed port to the gas vent port is from about 0.5 to about 3 minutes. Such residence time can be readily determined by, for example, injecting a liquid distinctively colored die with the polymer supplied to the feed section and determining the time for the colored polymer to appear at each of the two ports. The residence time is critical because if it is too low, it is not possible to achieve the desired reduction in molecular weight of the polymer and if it is too high, it is difficult to achieve control of the reduction in polymer molecular weight. The rate of rotation of the screws within the extruder may vary depending on the size of the extruder, the polymer throughput rate and the amount of gas being supplied to the extruder—the rate of rotation will be such as to achieve shearing in the reaction section and will generally be from as low as about 30 rpm up to as high as about 500 rpm, most preferably from about 50 to about 300 rpm.

The gas supplied to the gas feed line is an oxygen-containing gas selected from air or a mixture of gases containing not less than about 5 and not more than about 30 per cent by volume of oxygen and one or more chemically inert gases, with air being the preferred gas. It is supplied to the gas feed line at a pressure of from about 1.1 to about 3.5 kg/cm$^2$, preferably from about 1.3 to about 2.7 kg/cm$^2$. The rate at which the gas is supplied to the gas feed line depends on the polymer throughput rate and, accordingly, the rate in liters/hour of gas is from about 10 to about 500 times, preferably from about 20 to about 200 times, the polymer throughput rate in kg/hour. The presence of the oxygen-containing gas is essential in order to produce the desired product molecular weight at the temperatures used.

The low molecular weight isobutylene-containing polymer produced by the present process may be used in similar applications to those for the commercially available low molecular weight products directly polymerized to the various molecular weights desired by industry, such as plasticizers in rubber compounding, materials for the caulk and sealant industry and in certain food products.

The following example illustrates the invention described herein.

EXAMPLE

The extruder was a co-rotating, intermeshing twin screw machine of length about 108 cm, the screws having a diameter of about 3 cm, with temperature heating and cooling means along the major length of the barrel. The screws are driven by a 15 hp variable speed motor and the screw speed was adjusted to 200 rpm. The feed section is equipped with an open hopper through which the polymer can be fed to the interior of the extruder. Dry air was supplied to the gas feed port at a pressure of approximately 1.4 kg/cm$^2$ through a rotameter to measure, at ambient conditions, the rate of flow of the gas. The second vent port was connected to a vacuum means operated at about 71 cm of mercury vacuum. The polymer was a butyl rubber containing approximately 98.4 mole per cent of isobutylene and approximately 1.6 mole per cent of isoprene, contained no antioxidant-type component and was supplied as ground particles of about 0.5 to about 2 cm particle size coated with either talc or calcium carbonate such that the coating formed approximately 30 to 40 parts by weight per 100 parts by weight of polymer. At a polymer throughput rate of 4.55 kg/hour and an extruder temperature of 160° C., the residence time of the polymer in the extruder from the gas feed port to the gas vent port was about 1.2 minutes, and at a polymer throughput rate of 6.8 kg/hour and an extruder temperature of 220° C., the residence time was about 0.9 minutes. The experimental data are shown in the Table.

In the Table, Experiments #1, 5, 9, 13, 17 and 21 are controls, with no air being supplied to the extruder, Experiment #25 is a control with nitrogen instead of air being supplied to the extruder, and Experiments #12 and 26 are controls being the original polymers prior to passage through the extruder. For Experiments #1–12, the particulate butyl was coated with talc and for Experiments #13–26 the particulate butyl was coated with calcium carbonate. Similar experiments with the extruder temperature set at 160° C. yielded low molecular weight polymers having molecular weights ($M_w$) of about 150×10$^3$ and higher at a polymer feed rate of about 2.27 kg/hour and an air injection rate of about 350 l/hour. In similar experiments when the extruder temperature was allowed to fluctuate, for short time periods, up to about 230° to about 240° C. control of the extent of molecular weight reduction became significantly more difficult.

TABLE

| Experiment # | Polymer Feed Rate kg/hour | Extruder Temperature °C. | Air Injection Rate l/hour | Molecular Weight $M_w \times 10^3$ |
|---|---|---|---|---|
| 1 | 4.55 | 220 | 0 | 185 |
| 2 | 4.55 | 220 | 170 | 71.5 |
| 3 | 4.55 | 220 | 350 | 62 |
| 4 | 4.55 | 220 | 520 | 72 |
| 5 | 2.27 | 190 | 0 | 220 |
| 6 | 2.27 | 190 | 170 | 79 |
| 7 | 2.27 | 190 | 350 | 87 |
| 8 | 2.27 | 190 | 520 | 87 |
| 9 | 9.07 | 220 | 0 | 244 |
| 10 | 9.07 | 220 | 170 | 104.5 |
| 11 | 9.07 | 220 | 350 | 84 |
| 12 | — | — | — | 506 |
| 13 | 2.27 | 220 | 0 | 164.5 |
| 14 | 2.27 | 220 | 170 | 41.5 |
| 15 | 2.27 | 220 | 350 | 34.5 |
| 16 | 2.27 | 220 | 520 | 37.5 |
| 17 | 6.8 | 220 | 0 | 238 |
| 18 | 6.8 | 220 | 170 | 98 |
| 19 | 6.8 | 220 | 350 | 92 |
| 20 | 6.8 | 220 | 520 | 85 |
| 21 | 2.27 | 190 | 0 | 236 |
| 22 | 2.27 | 190 | 170 | 110 |
| 23 | 2.27 | 190 | 350 | 96 |
| 24 | 2.27 | 190 | 520 | 76 |
| 25 | 2.27 | 190 | 170 (N$_2$) | 225 |
| 26 | — | — | — | 514 |

What is claimed is:

1. A process for the production of a low molecular weight isobutylene polymer which comprises feeding to an extruder an isobutylene-conjugated diolefin copolymer containing essentially no antioxidant-type component having a molecular weight $M_w$ of from about 350×10$^3$ to about 700×10$^3$ and having no added free radical sources and reacting said polymer with gas within said extruder to produce said low molecular weight polymer having a molecular weight $M_w$ of from about 25×10$^3$ to about 150×10$^3$, characterized in that:

(a) said extruder consists essentially of a twin screw extruder mixer device capable of providing a high degree of interfacial contact between the viscous polymeric material and a gaseous phase and having a feed section, a reaction section and a volatiles removal section and being equipped with a gas feed port attached to and communicating with the interior of the extruder barrel at a point closely adjacent to the junction of the feed section and the reaction section, and being equipped with a gas vent port attached to and communicating with the interior of the extruder barrel at a point closely adjacent to the junction of the reaction section and the volatiles removal section and a second vent port also connected to a vacuum means attached to and communicating with the interior of said extruder barrel at a point with the volatiles removal section, the screws within the reaction section being equipped with shearing flights and within the feed section and the volatiles removal section being equipped with mixing and conveying flights, (b) said polymer is conveyed through said extruder by said screws and is reacted in at least said reaction section with gas supplied from said gas feed port, gas is removed through said gas vent port and any volatile materials are removed through said second vent port, (c) said extruder is maintained at a temperature of from about 150° to about 250° C., (d) the residence time for said polymer in said extruder from said gas feed port to said gas vent port is from about 0.5 to about 3 minutes, and (e) the gas supplied to said gas feed port is an oxygen-containing gas selected from air or a mixture of gases containing not less than about 5 and not more than about 30 per cent by volume of oxygen and one or more chemically inert gases at a pressure of from about 1.1 to about 3.5 kg/cm$^2$ at a rate in liters/hour of from about 10 to about 500 times the polymer throughput rate in kg/hour.

2. The process of claim 1 wherein the isobutylene-conjugated diolefin copolymer is a copolymer containing from about 95 to about 99.5 mole per cent of isobutylene and from about 0.5 to about 5 mole per cent of $C_4$–$C_6$ conjugated diolefin.

3. The process of claim 2 wherein the conjugated diolefin is isoprene.

4. The process of claim 1 wherein the isobutylene-conjugated diolefin copolymer is a copolymer containing from about 98 to about 99 mole per cent of isobutylene and from about 1 to about 2 mole per cent of isoprene.

5. The process of claim 1 wherein the isobutylene-conjugated diolefin copolymer is fed to the extruder as particles.

6. The process of claim 5 wherein the particles of copolymer are coated with a partitioning agent selected from talc, calcium carbonate or clay.

7. The process of claim 1 in which the temperature of the extruder is from about 180° to about 230° C.

8. The process of claim 1 in which the gas is supplied to the gas feed port at a rate in liters/hour of from about 20 to about 200 times the polymer throughput rate in kg/hour.

9. The process of claim 8 wherein the pressure of the gas supplied to the gas feed port is from about 1.3 to about 2.7 kg/cm$^2$ 10. The process of claim 1 wherein the gas is air.

* * * * *